(12) United States Patent
Huang

(10) Patent No.: US 11,383,652 B1
(45) Date of Patent: Jul. 12, 2022

(54) CARRYING MECHANISM AND VEHICLE CARRIER INCLUDING THE SAME

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 0 days.

(21) Appl. No.: 17/158,684

(22) Filed: Jan. 26, 2021

(51) Int. Cl.
*B60R 9/10* (2006.01)
(52) U.S. Cl.
CPC ...................................... *B60R 9/10* (2013.01)
(58) Field of Classification Search
CPC ................................. B60R 9/10; Y10S 224/924
USPC ......................................................... 224/924
See application file for complete search history.

(56) References Cited

U.S. PATENT DOCUMENTS

| | | | | |
|---|---|---|---|---|
| 5,417,358 A | * | 5/1995 | Haselgrove | B60R 9/042 224/310 |
| 6,015,074 A | * | 1/2000 | Snavely | B60R 9/042 224/310 |
| 6,524,056 B1 | * | 2/2003 | Kloster | B60P 3/122 414/571 |
| 6,695,184 B2 | * | 2/2004 | Higginbotham, III | B60R 9/10 224/501 |
| 7,083,373 B1 | * | 8/2006 | Boudreau | B60R 9/065 414/537 |
| 8,857,880 B2 | * | 10/2014 | Kalergis | B62D 33/00 224/543 |
| 10,029,598 B2 | * | 7/2018 | Keck | B65G 69/30 |
| 2018/0093617 A1 | * | 4/2018 | Kuhlbach | B60L 53/305 |
| 2021/0276493 A1 | * | 9/2021 | Neill | B60R 9/042 |

FOREIGN PATENT DOCUMENTS

| | | | | |
|---|---|---|---|---|
| DE | 102012012889 A1 | * | 1/2014 | B60R 9/06 |
| GB | 2440928 A | * | 2/2008 | B60R 9/04 |

* cited by examiner

*Primary Examiner* — Scott T McNurlen
(74) *Attorney, Agent, or Firm* — Muncy, Geissler, Olds & Lowe, P.C.

(57) ABSTRACT

A carrying mechanism for a vehicle carrier is provided, including: a frame, a slide rail, and a pivot mechanism. The frame includes a holding surface and a receiving groove extending along a longitudinal direction of the frame. The slide rail is slidably disposed within the receiving groove and movable along the longitudinal direction. The pivot mechanism includes a first pivoting portion disposed on the frame and a second pivoting portion disposed on the slide rail, and the first pivoting portion is connected with the second pivoting portion. A vehicle carrier is further provided, including the carrying mechanism as described above, further including: a hanging member and at least one sub-frame. The hanging member is connected with the carrying mechanism. The at least one sub-frame is connected with the hanging member and has a third pivoting portion removably connected with the second pivoting portion.

9 Claims, 7 Drawing Sheets

CARRYING MECHANISM AND VEHICLE CARRIER INCLUDING THE SAME

BACKGROUND OF THE INVENTION

Field of the Invention

The present invention relates to a carrying mechanism and a vehicle carrier including the same.

Description of the Prior Art

A conventional vehicle carrier is used to carry bicycles, electric bicycles and electric scooters, or the like. In operation, an operator has to directly move the cycle onto or from the vehicle carrier. If the cycle is heavy, a supporting board is used to connect the vehicle carriers with the ground so that the cycle can be pushed onto the vehicle carrier by the supporting board, which is laborsaving.

However, the supporting board is directly leaned against the vehicle carrier without positioning mechanism, which has poor assembling stability, and the supporting board is inconvenient to use and storage.

The present invention is, therefore, arisen to obviate or at least mitigate the above-mentioned disadvantages.

SUMMARY OF THE INVENTION

The main object of the present invention is to provide a carrying mechanism and a vehicle carrier including the same which are convenient to use and storage.

To achieve the above and other objects, the present invention provides a carrying mechanism, including: a frame, a slide rail and a pivot mechanism. The frame includes a holding surface configured for a cycle to be placed thereon and a receiving groove extending along a longitudinal direction of the frame, and the receiving groove has an opening open to an end of the frame. The slide rail is slidably disposed within the receiving groove and movable in the longitudinal direction between a first position and a second position. The pivot mechanism includes a first pivoting portion disposed on the frame and a second pivoting portion disposed on the slide rail, and the first pivoting portion is removably and rotatably connected with the second pivoting portion. When the slide rail is in the first position, the slide rail is sleeved with the frame and non-swingable relative to the frame; when the slide rail is in the second position, at least part of the slide rail is moved out of the receiving groove and the slide rail is swingable relative to the frame.

To achieve the above and other objects, the present invention further provides a vehicle carrier, including the carrying mechanism as described above, further including: a hanging member and at least one sub-frame. The hanging member is connected with the carrying mechanism and configured to be detachably assembled with a hanging mechanism of a vehicle. The at least one sub-frame is connected with the hanging member and configured for at least one said cycle to be placed thereon, and an end of each of the at least one sub-frame includes a third pivoting portion which is removably and rotatably connected with the second pivoting portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 10 for a preferable embodiment of the present invention. A carrying mechanism 1 of the present invention includes: a frame 10, a slide rail 20 and a pivot mechanism 30.

Figure 1:
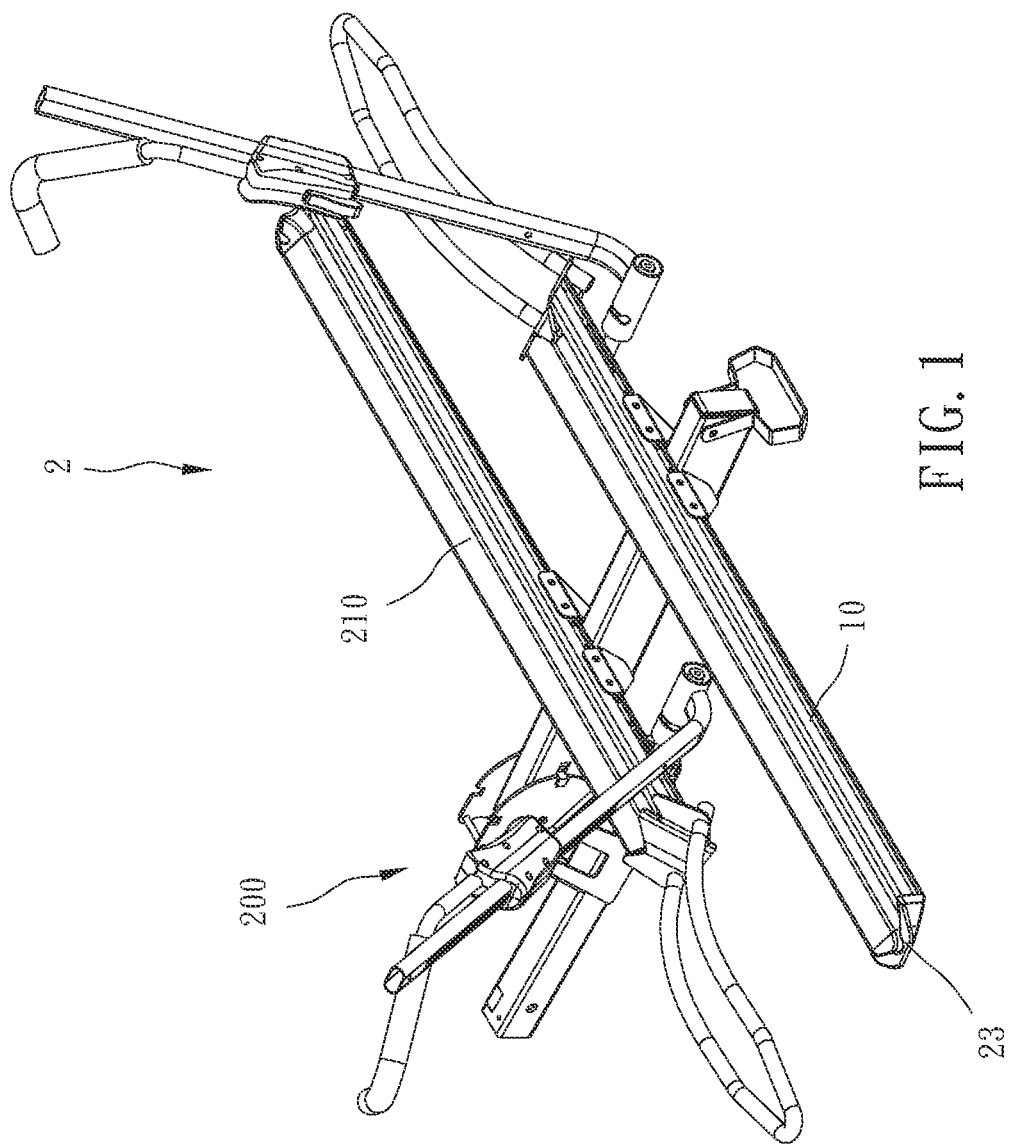
FIG. 1 is a stereogram of a preferable embodiment of the present invention.
Figure 2:
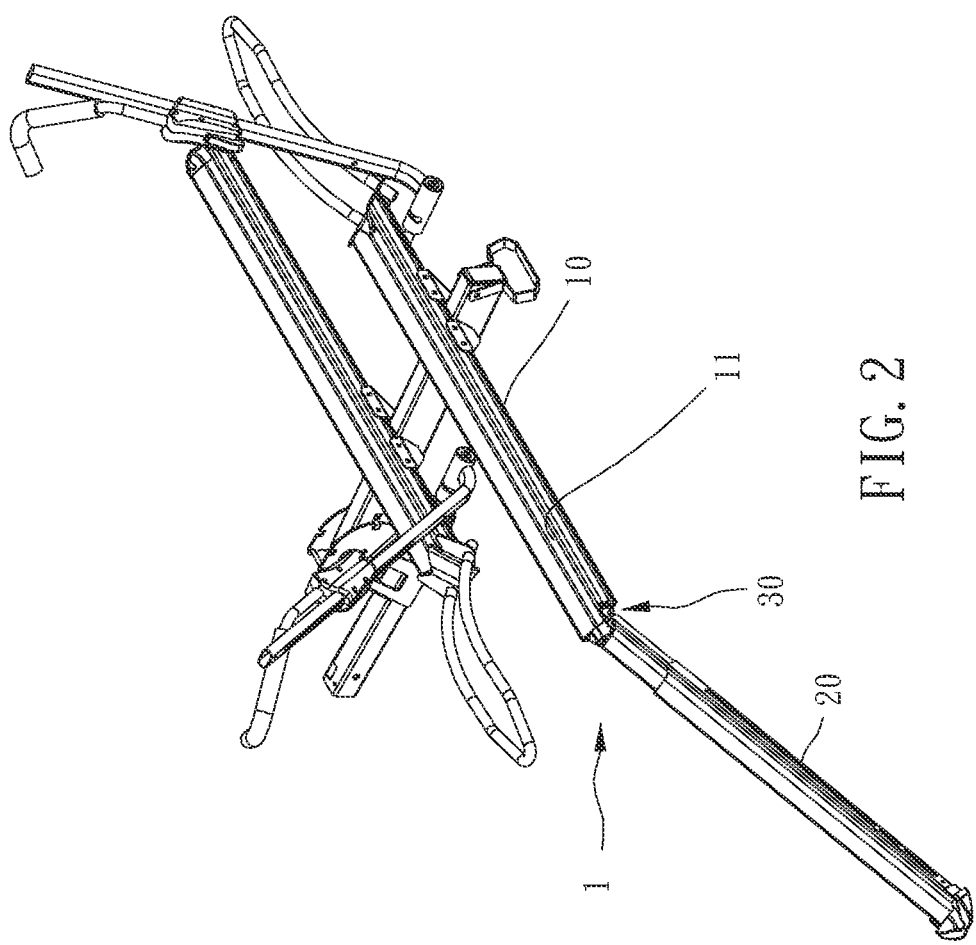
FIG. 2 is a stereogram of a preferable embodiment of the present invention when a slide rail is in a second position.

The frame 10 includes a holding surface 11 configured for a cycle to be placed thereon and a receiving groove 12 extending along a longitudinal direction of the frame 10, and the receiving groove 12 has an opening 121 open to an end of the frame 10. The slide rail 20 is slidably disposed within the receiving groove 12 and movable in the longitudinal direction between a first position and a second position. The pivot mechanism 30 includes a first pivoting portion 31 disposed on the frame and a second pivoting portion 32 disposed on the slide rail 20, and the first pivoting portion 31 is removably and rotatably connected with the second pivoting portion 32. When the slide rail 20 is in the first position, the slide rail 20 is sleeved with the frame 10 and non-swingable relative to the frame 10, which is convenient to storage and carry, as shown in FIG. 1. When the slide rail 20 is in the second position, at least part of the slide rail 20 is moved out of the receiving groove 12 and the slide rail 20 is swingable relative to the frame 10, as shown in FIG. 2. Therefore, the cycle can be pushed onto or off the frame 10 along the slide rail 20, which is easy to operate and laborsaving.

In this embodiment, the frame 10 is a tubular member enclosed circumferentially, which provides good structural strength and protection of inner components and prevents external objects from moving into the receiving groove 12 for smooth operation; the holding surface 11 includes an arcuate surface 111 concave toward the receiving groove 12 and two inclined surfaces 112 located at two opposite sides of the arcuate surface 111, and each of the two inclined surfaces 112 extends obliquely in a direction from the arcuate surface 111 to an outer side of the receiving groove 12 so that wheels of the cycle are stably restricted and not easy to dislocate from the holding surface 11 during transport.

Figure 3:
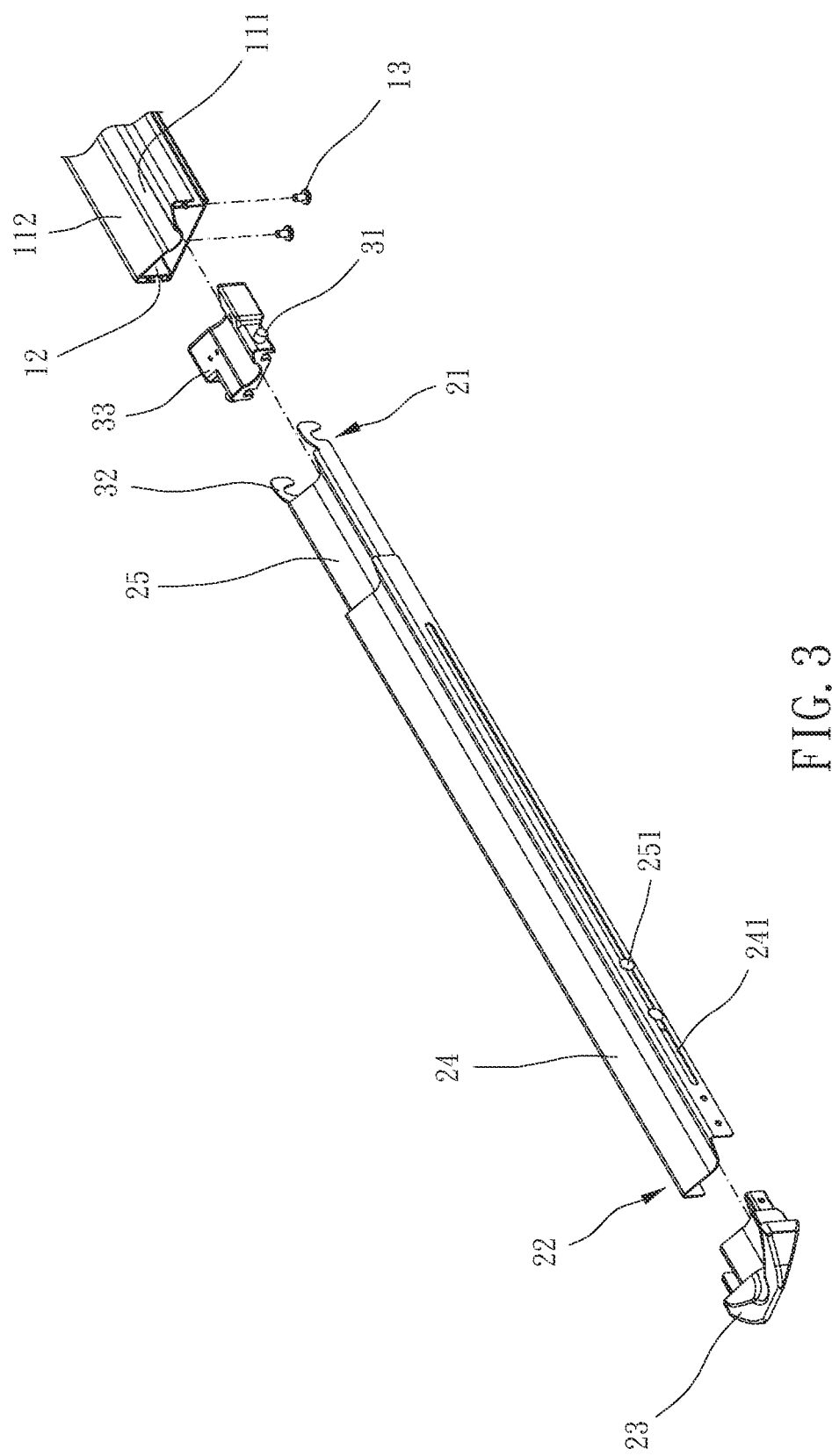
FIG. 3 is a partial breakdown drawing of a preferable embodiment of the present invention.
Figure 4:
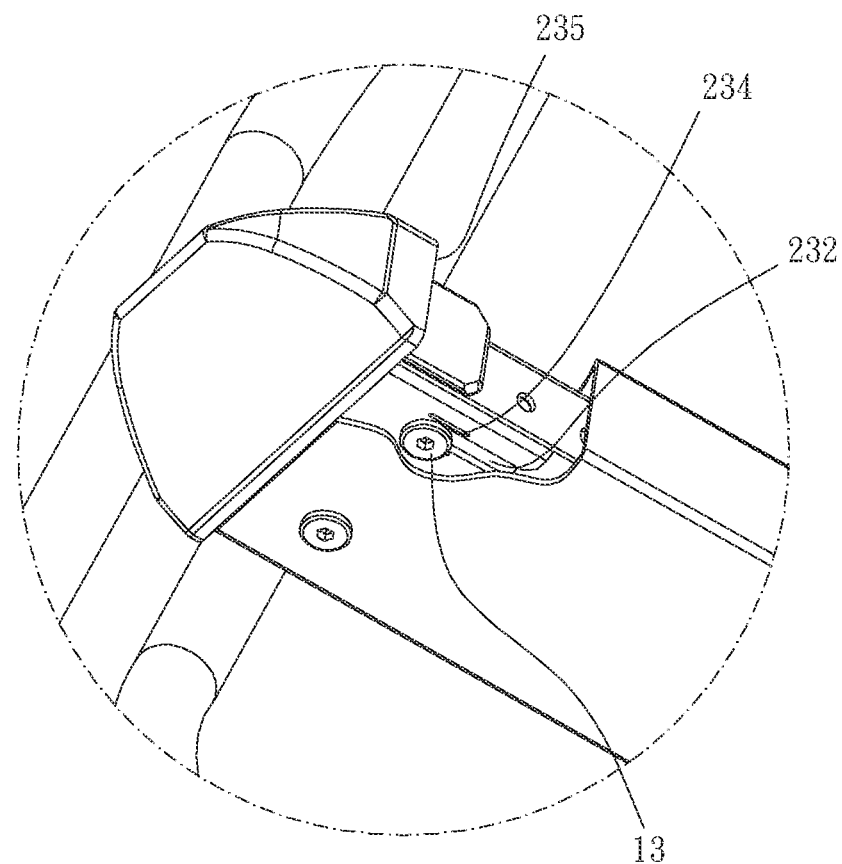
FIG. 4 is an enlarged partial cross-sectional view of a preferable embodiment of the present invention when the slide rail is in a first position.
Figure 5:
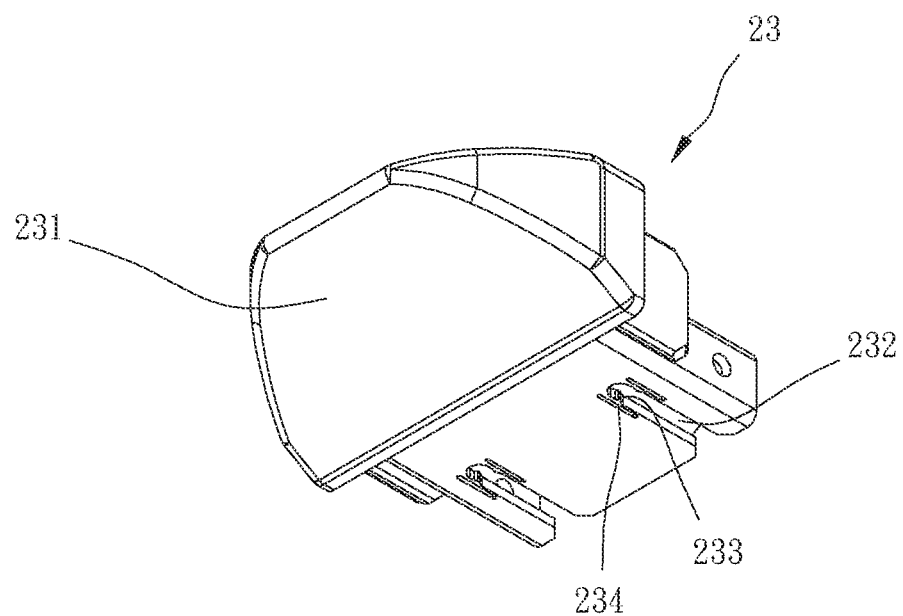
FIG. 5 is a stereogram showing an abutting seat according to a preferable embodiment of the present invention.

Please refer to FIGS. 2 and 3, the slide rail 20 includes a first end 21 having the second pivoting portion 32 disposed thereon and a second end 22 remote from the first end 21. The second end 22 has an abutting seat 23, and the abutting seat 23 includes an abutting surface 231 tilted to the longitudinal direction. When the slide rail 20 is in the second position, the abutting surface 231 is configured to be abuttable against a ground to have good operation safety. Please refer to FIGS. 4 and 5, an end of the frame 10 close to the opening 121 preferably has at least one blocking member 13, and the abutting seat 23 further includes at least one first engaging slot 232 open to the opening 121 and corresponding to the at least one blocking member 13. When the slide rail 20 is in the first position, the at least one blocking member 13 is releasably engaged within the at least one first engaging slot 232 so as to prevent the slide rail 20 from being unexpectedly moved out of the receiving groove 12. Each of the at least one blocking member 13 may be a screw or a fastener penetrating through the frame 10, which is easy to process. In this embodiment, the at least one first engaging slot 232 extends in the longitudinal direction, an inner wall of each of the at least one first engaging slot 232 has at least one engaging projection 233 extending inward, and each of the at least one engaging projection 233 is interferingly blockable with one of the at least one blocking member 13 in the longitudinal direction. Two opposite sides of each of the at least one first engaging slot 232 has at least one slot 234 corresponding to the at least one engaging projection 233, therefore, when the at least one blocking member 13 is moved along the at least one first engaging slot 232 and urged the at least one engaging projection 233, the at least one slot 234 allows a wall of the at least one first engaging slot 232 to be elastically deformed so as to have stable engagement. Preferably, the abutting seat 23 further includes a restricting surface 235 facing the frame 10, and the restricting surface 235 is restrictedly abutted against the frame 10 in the longitudinal direction when the slide rail 20 is in the first position so as to prevent the slide rail 20 from being pushed into the receiving groove 12.

The slide rail 20 includes a first rod body 24 and a second rod body 25 connected between the first rod body 24 and the frame 10, and the first rod body 24 is slidably sleeved with the second rod body 25 so that a length of the slide rail 20 is adjustable to apply to various vehicles with different assembling heights. Specifically, one of the first rod body 24 and the second rod body 25 has at least one guiding groove 241, and the other of the first rod body 24 and the second rod body 25 has at least one guiding projection 251 slidably disposed within the at least one guiding groove 241 so that the first rod body 24 and the second rod body 25 are stably and smoothly movable relative to each other and have simple structures for easy manufacturing. The first rod body 24 and the second rod body 25 are respectively made by folding a board so as to have good structural strength and light weight. However, the first rod body and the second rod body may respectively be a tubular member or be made by connecting a plurality of plates.

Figure 6:
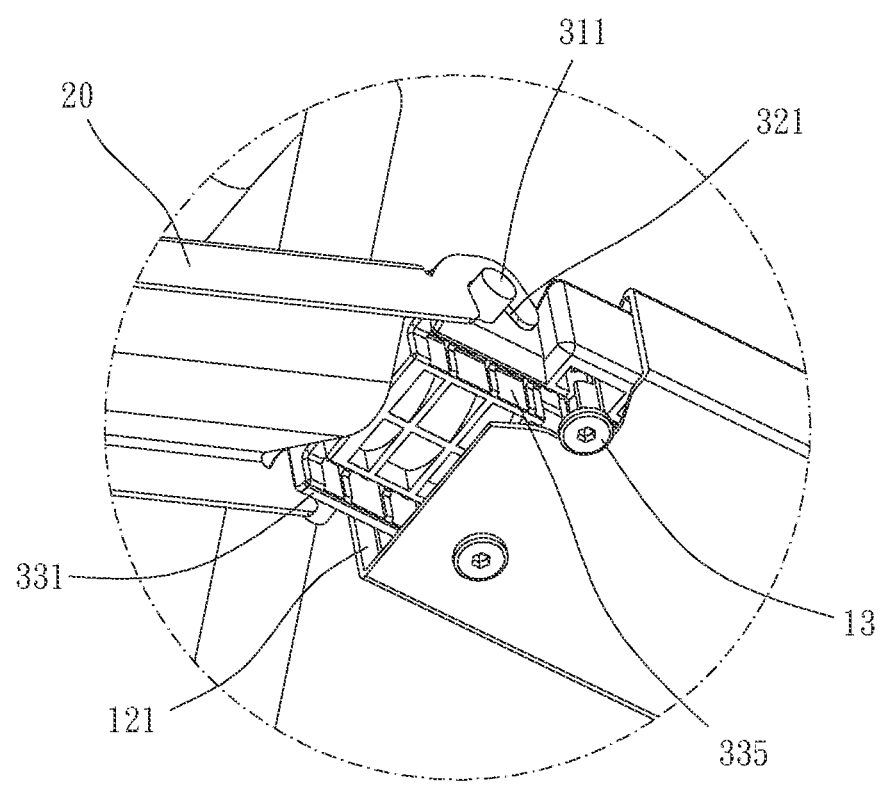
FIG. 6 is an enlarged partial cross-sectional view of a preferable embodiment of the present invention when the slide rail is in the second position.
Figure 7:
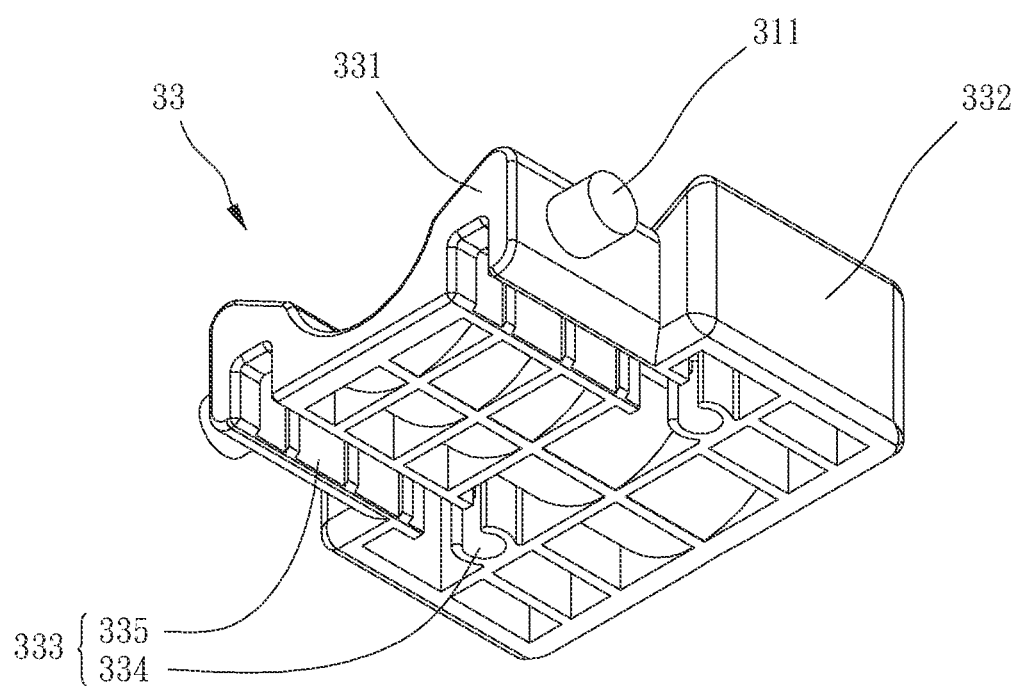
FIG. 7 is a stereogram showing a sliding seat according to a preferable embodiment of the present invention.
Figures 8, 9:
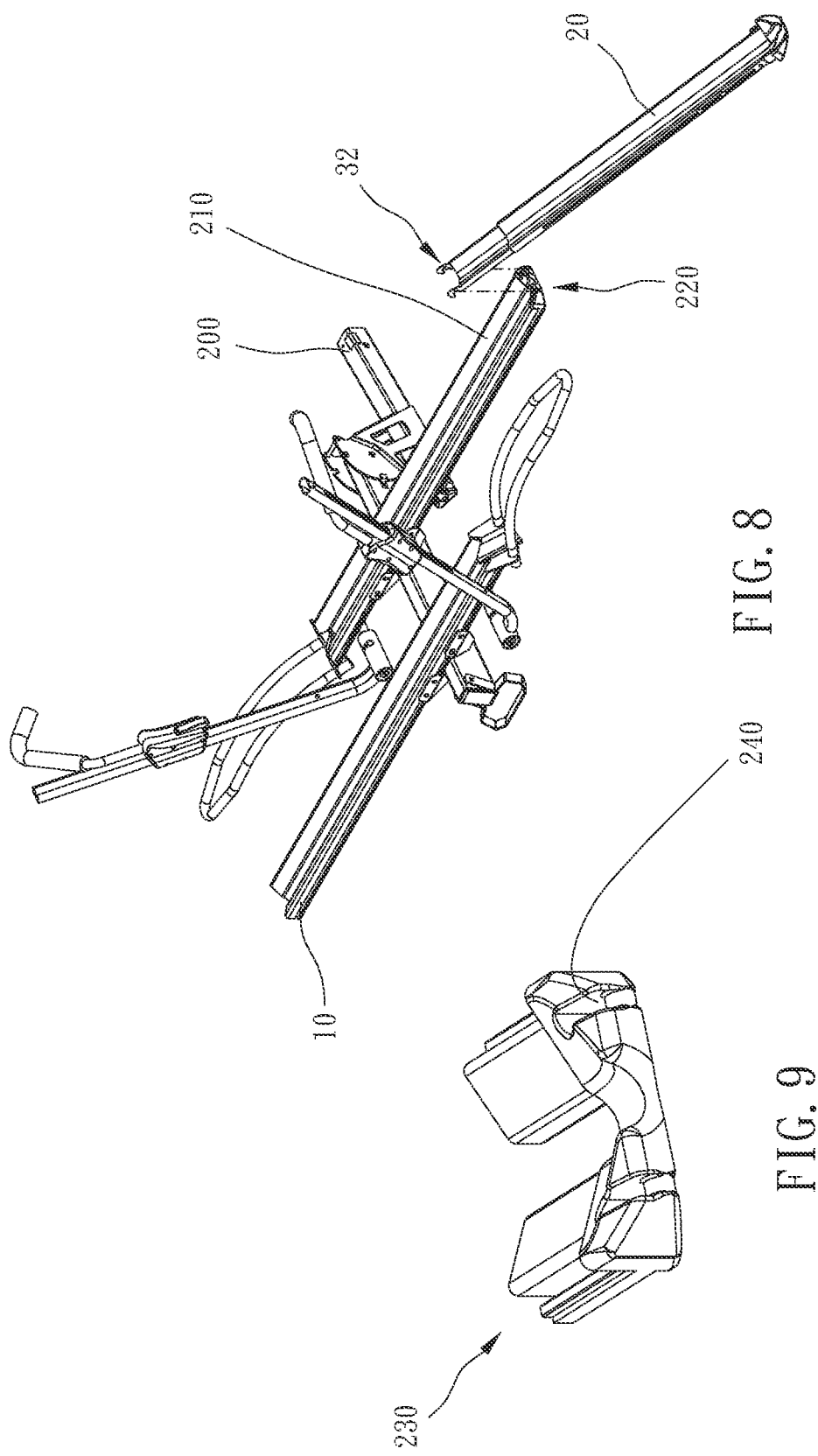
FIGS. 8 and 10 are schematic diagrams showing operation according to a preferable embodiment of the present invention.
FIG. 9 is a stereogram showing an assembling member according to a preferable embodiment of the present invention.
Figure 10:
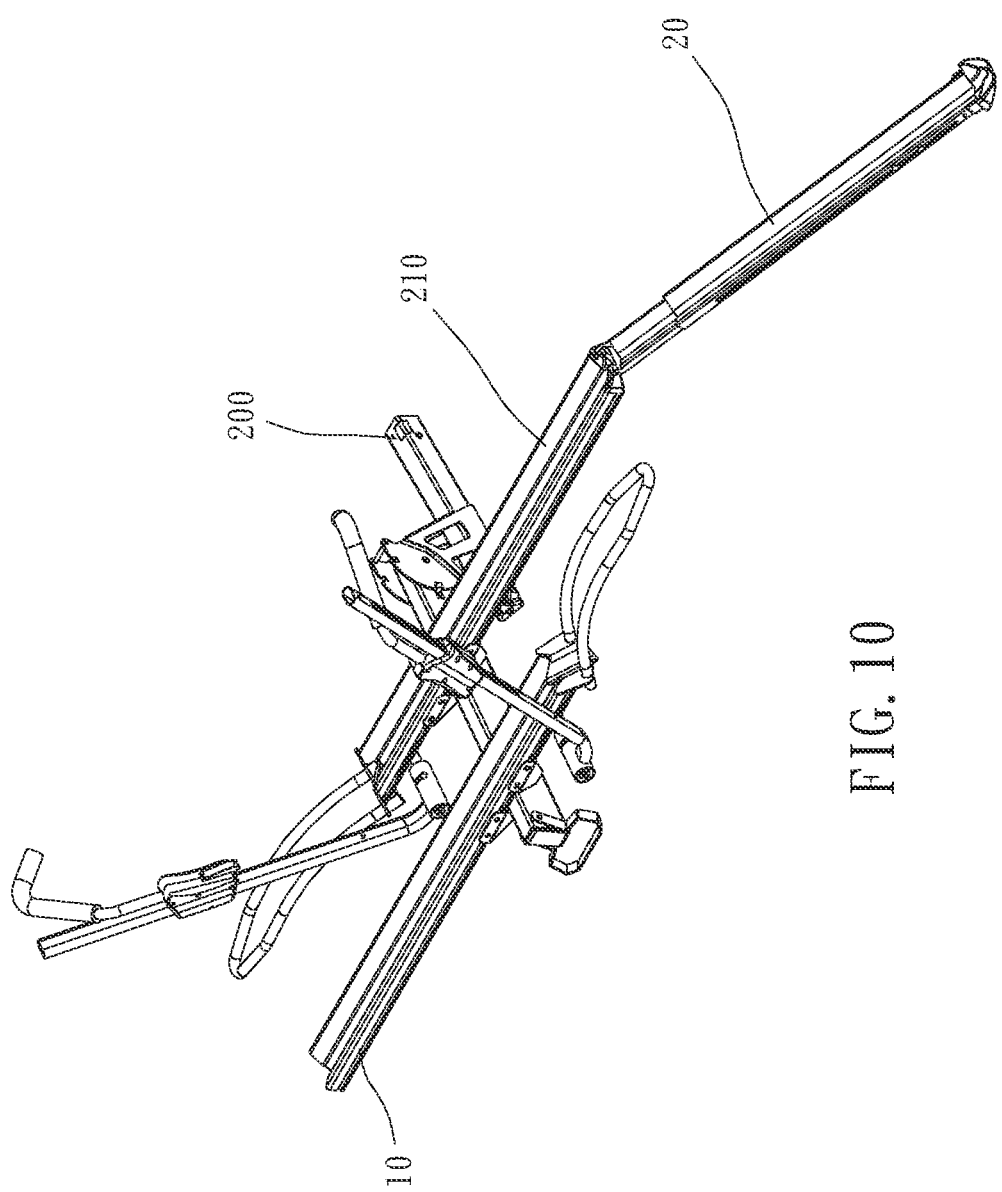

Please refer to FIGS. 6 and 7, the pivot mechanism 30 further includes a sliding seat 33 slidably disposed within the receiving groove 12, and the sliding seat 33 has the first pivoting portion 31 disposed thereon and is comovable with the slide rail 20 in the longitudinal direction. Specifically, the sliding seat 33 includes a first portion 331 having the first pivoting portion 31 and a second portion 332, and a cross-sectional contour of the second portion 332 corresponds to a cross-sectional contour of the receiving groove 12 so that the sliding seat 33 is stably and smoothly movable in the receiving groove 12. When the slide rail 20 is in the second position, the first portion 331 protrudes out of the opening 121 and the slide rail 20 is smoothly swingable relative to the frame 10. A diametrical dimension of the first portion 331 is smaller than a diametrical dimension of the second portion 332 so as to have sufficient space for assembling the second pivoting portion 32. In this embodiment, the first pivoting portion 31 includes two protrusions 311 disposed on two opposite sides of the first portion 331, and the second pivoting portion 32 includes two hooked ears 321 integrally extending from two opposite sidewalls of the slide rail 20, which is easy to be assembled and provides stable connection. However, the first pivoting portion may include only one pivot; the first pivoting portion may include at least one engaging recess, and the second pivoting portion may include at least one shaft being engageable within the at least one engaging recess.

The at least one blocking member 13 is interferingly blockable with the sliding seat 33 in the longitudinal direction, specifically, the sliding seat 33 has at least one second engaging slot 333 open to the opening 121 and corresponding to the at least one blocking member 13, and the at least one blocking member 13 is releasably engaged within the at least one second engaging slot 333 when the slide rail 20 is in the second position so as to prevent the sliding seat 33 from removing from the frame 10. In this embodiment, each of the at least one second engaging slot 333 includes an engaging portion 334 and a guiding portion 335 extending along the longitudinal direction, and the engaging portion 334 is open to the guiding portion 335 and spaced apart from the guiding portion 335 so as to effectively guild and restrict the at least one blocking member 13 and prevent the sliding seat 33 from being skew during movement. Moreover, a wall of the engaging portion 334 is elastically deformable so as to provide stable engagement. In other embodiment, the engaging portion may be connected with the guiding portion.

The present invention further provides a vehicle carrier 2, including the carrying mechanism 1 as described above, further including: a hanging member 200 and at least one sub-frame 210. The hanging member 200 is connected with the carrying mechanism 1 and configured to be detachably assembled with a hanging mechanism of a vehicle. The at least one sub-frame 210 is connected with the hanging member 200 and configured for at least one said cycle to be placed thereon, and an end of each of the at least one sub-frame 210 includes a third pivoting portion 220 removably and rotatably connected with the second pivoting portion 32. Please refer to FIGS. 8 to 10, in this embodiment, the end of each of the at least one sub-frame 210 has an assembling member 230 disposed thereon, and the third pivoting portion 220 is disposed on the assembling member 230 and includes two concave portions 240 corresponding to the two hooked ears 321. In operation, the slide rail 20 is selectively rotatably connected to the frame 10 or one of the at least one sub-frame 210, and the cycle can be pushed onto or off the frame 10 or/and the at least one sub-frame 210 through the slide rail 20, which is easy to use and laborsaving. The slide rail 20 is received within the receiving groove 12 after operation, which is convenient to storage and carry. In other embodiment, each said sub-frame may be directly connected with the slide rail without the assembling member.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A carrying mechanism, for a vehicle carrier, the carrying mechanism including:
   a frame, including a holding surface configured for a cycle to be placed thereon and a receiving groove extending along a longitudinal direction of the frame, the receiving groove having an opening open to an end of the frame;
   a slide rail, slidably disposed within the receiving groove and movable in the longitudinal direction between a first position and a second position; and
   a pivot mechanism, including a first pivoting portion disposed on the frame and a second pivoting portion disposed on the slide rail, the first pivoting portion being removably and rotatably connected with the second pivoting portion;
   wherein when the slide rail is in the first position, the slide rail is sleeved with the frame and non-swingable relative to the frame; when the slide rail is in the second position, at least part of the slide rail is moved out of the receiving groove and the slide rail is swingable relative to the frame;
   wherein the slide rail includes a first end having the second pivoting portion disposed thereon and a second end remote from the first end, the second end has an abutting seat;
   wherein an end of the frame close to the opening has at least one blocking member, the abutting seat includes at least one first engaging slot open to the opening and corresponding to the at least one blocking member, and the at least one blocking member is releasably engaged within the at least one first engaging slot when the slide rail is in the first position.

2. The carrying mechanism of claim 1, wherein the abutting seat further includes an abutting surface tilted to the longitudinal direction, and the abutting surface is configured to be abuttable against a ground when the slide rail is in the second position.

3. The carrying mechanism of claim 2, wherein the holding surface includes an arcuate surface concave toward the receiving groove and two inclined surfaces located at two opposite sides of the arcuate surface, each of the two inclined surfaces extends obliquely in a direction from the arcuate surface to an outer side of the receiving groove; the slide rail includes a first rod body and a second rod body connected between the first rod body and the frame, the first rod body is slidably sleeved with the second rod body; one of the first rod body and the second rod body includes at least one guiding groove, and the other of the first rod body and the second rod body includes at least one guiding projection slidably disposed within the at least one guiding groove; the first rod body and the second rod body are respectively made by folding a board; each of the at least one first engaging slot extends in the longitudinal direction, an inner wall of each of the at least one first engaging slot has at least one engaging projection extending inward, and each of the at least one engaging projection is interferingly blockable with one of the at least one blocking member in the longitudinal direction; two opposite sides of each of the at least one first engaging slot has at least one slot corresponding to the at least one engaging projection; the abutting seat further includes a restricting surface facing the frame, and the restricting surface is restrictedly abutted against the frame in the longitudinal direction when the slide rail is in the first position; the pivot mechanism further includes a sliding seat slidably disposed within the receiving groove, the sliding seat has the first pivoting portion disposed thereon and is comovable with the slide rail in the longitudinal direction; the at least one blocking member is interferingly blockable with the sliding seat in the longitudinal direction; the sliding seat has at least one second engaging slot open toward the opening and corresponding to the at least one blocking member, and the at least one blocking member is releasably engaged within the at least one second engaging slot when the slide rail is in the second position; each of the at least one second engaging slot includes an engaging portion and a guiding portion extending along the longitudinal direction, the engaging portion is open to the guiding portion and spaced apart from the guiding portion; the frame is a tubular member enclosed circumferentially; the sliding seat includes a first portion having the first pivoting portion disposed thereon and a second portion, a cross-sectional contour of the second portion corresponds to a cross-sectional contour of the receiving groove, and the first portion protrudes out of the opening when the slide rail is in the second position; and a diametrical dimension of the first portion is smaller than a diametrical dimension of the second portion.

4. The carrying mechanism of claim 1, wherein the slide rail includes a first rod body and a second rod body connected between the first rod body and the frame, and the first rod body is slidably sleeved with the second rod body.

5. The carrying mechanism of claim 1, wherein the pivot mechanism further includes a sliding seat slidably disposed within the receiving groove, and the sliding seat has the first pivoting portion disposed thereon and is comovable with the slide rail in the longitudinal direction.

6. The carrying mechanism of claim 5, wherein the sliding seat includes a first portion having the first pivoting portion disposed thereon and a second portion, a cross-sectional contour of the second portion corresponds to a cross-sectional contour of the receiving groove, and the first portion protrudes out of the opening when the slide rail is in the second position.

7. The carrying mechanism of claim 5, wherein the at least one blocking member is interferingly blockable with the sliding seat in the longitudinal direction.

8. The carrying mechanism of claim 7, wherein the sliding seat has at least one second engaging slot open to the opening and corresponding to the at least one blocking member, and the at least one blocking member is releasably engaged within the at least one second engaging slot when the slide rail is in the second position.

9. A vehicle carrier, including the carrying mechanism of claim 1, further including:
   a hanging member, connected with the carrying mechanism, configured to be detachably assembled with a hanging mechanism of a vehicle; and
   at least one sub-frame, connected with the hanging member, configured for at least one said cycle to be placed thereon, an end of each of the at least one sub-frame including a third pivoting portion removably and rotatably connected with the second pivoting portion.

* * * * *